United States Patent
Regensburger et al.

(10) Patent No.: US 11,282,211 B2
(45) Date of Patent: Mar. 22, 2022

(54) MEDICAL IMAGING DEVICE, METHOD FOR SUPPORTING MEDICAL PERSONNEL, COMPUTER PROGRAM PRODUCT, AND COMPUTER-READABLE STORAGE MEDIUM

(71) Applicant: Siemens Healthcare GmbH, Erlangen (DE)

(72) Inventors: Alois Regensburger, Erlangen (DE); Amilcar Alzaga, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 75 days.

(21) Appl. No.: 16/747,668

(22) Filed: Jan. 21, 2020

(65) Prior Publication Data
US 2020/0234449 A1 Jul. 23, 2020

(30) Foreign Application Priority Data
Jan. 23, 2019 (DE) .......................... 102019200786.4

(51) Int. Cl.
*G06K 9/00* (2006.01)
*G06T 7/174* (2017.01)
(Continued)

(52) U.S. Cl.
CPC ............... *G06T 7/174* (2017.01); *G06T 7/70* (2017.01); *G06T 19/20* (2013.01);
(Continued)

(58) Field of Classification Search
CPC ........... G06T 7/174; G06T 19/20; G06T 7/70; G06T 2207/30244; G06T 2219/2004;
(Continued)

(56) References Cited

U.S. PATENT DOCUMENTS 9,129,422 B2 9/2015 Mountney
9,547,940 B1* 1/2017 Sun .......................... G06T 7/344
(Continued)

FOREIGN PATENT DOCUMENTS

EP 3165153 A1 5/2017

OTHER PUBLICATIONS

Conrad, Claudius, et al. "Augmented reality navigation surgery facilitates laparoscopic rescue of failed portal vein embolization." Journal of the American College of Surgeons 223.4 (2016): e31-e34.
(Continued)

*Primary Examiner* — Stephen P Coleman
(74) *Attorney, Agent, or Firm* — Lempia Summerfield Katz LLC (57) ABSTRACT

The disclosure relates to a medical imaging device, a method for supporting medical personnel, a corresponding computer program product, and a corresponding computer-readable storage medium. In the method, a 3D data record is received from a first imaging modality and image data of an examination object is received from a second imaging modality. Different tissue regions of the same organ are imaged with different imaging properties at least under the second imaging modality. A tissue boundary is detected between the tissue regions in the image data. For registration of the image data with the 3D data record, the tissue boundary is aligned at a corresponding tissue boundary in the 3D data record. In addition, or alternatively, based on the tissue boundary, an automatic movement compensation takes place of a movement of the examination object which has occurred during the generation of the image data.

20 Claims, 3 Drawing Sheets (51) Int. Cl.
*G06T 19/20* (2011.01)
*G06T 7/70* (2017.01)

(52) U.S. Cl.
CPC .............. *G06T 2207/10064* (2013.01); *G06T 2207/30244* (2013.01); *G06T 2219/2004* (2013.01)

(58) Field of Classification Search
CPC ............. G06T 2207/10064; G06T 7/33; G06T 2207/10024; G06T 2207/30056; G06T 2207/10132; G06T 2207/10012; G06T 2200/04; G06T 2207/10081; G06T 2207/10088; A61B 6/032; A61B 6/4417; A61B 5/055; A61B 6/466; A61B 6/463; A61B 6/5247; A61B 6/52; A61B 6/469
USPC ......................................................... 382/128
See application file for complete search history.

(56) References Cited

U.S. PATENT DOCUMENTS

| | | | |
|---|---|---|---|
| 2006/0089636 A1* | 4/2006 | Christopherson | A61B 18/1485 606/41 |
| 2009/0324048 A1 | 12/2009 | Leevy | |
| 2010/0266175 A1* | 10/2010 | Seung | G06T 7/11 382/128 |
| 2011/0040169 A1 | 2/2011 | Kamen | |
| 2012/0035462 A1* | 2/2012 | Maurer, Jr. | A61N 5/1077 600/411 |
| 2015/0289765 A1 | 10/2015 | Panitz | |

OTHER PUBLICATIONS

Diana, Michele, et al. "Enhanced-reality video fluorescence: a real-time assessment of intestinal viability." Annals of surgery 259.4 (2014): 700-707.

Nam, Woo Hyun et al. "Automatic registration between 3D intra-operative ultrasound and pre-operative CT images of the liver based on robust edge matching" Physics in Medicine & Biology, vol. 57; No. 1. (2011): pp. 69-91.

German Office Action for German Application No. 10 2019 200 786.4 dated Nov. 27, 2019.

Castaing, Denis, et al. "Segmental liver resection using ultrasound-guided selective portal venous occlusion." Annals of surgery 210.1 (1989): 20-23.

Durduran, Turgut, et al. "Diffuse optical measurement of blood flow, blood oxygenation, and metabolism in a human brain during sensorimotor cortex activation." Optics letters 29.15 (2004): 1766-1768.

Guevara, Jaime Garcia, et al. "Biomechanics-based graph matching for augmented CT-CBCT." International journal of computer assisted radiology and surgery 13.6 (2018): 805-813.

Mizuno, T., et al. "Laparoscopic glissonean pedicle transection method (TAKASAKI) for negative fluorescent counterstaining of segment 6." HPB 19 (2017): S114.

* cited by examiner

MEDICAL IMAGING DEVICE, METHOD FOR SUPPORTING MEDICAL PERSONNEL, COMPUTER PROGRAM PRODUCT, AND COMPUTER-READABLE STORAGE MEDIUM

The present patent document claims the benefit of German Patent Application No. 10 2019 200 786.4, filed Jan. 23, 2019, which is hereby incorporated by reference.

TECHNICAL FIELD

The disclosure relates to a medical imaging device and a method for supporting medical personnel. The disclosure further relates to a corresponding computer program product and a computer-readable storage medium on which a corresponding computer program product is stored.

BACKGROUND

In medical practice, it may be decisive for the success of a diagnosis and treatment that relevant medical personnel, for example, a physician or surgeon administering treatment, have the most precise and complete possible image of a relevant anatomical situation at the right time point. For this purpose, a whole range of measures and methods which may provide support to the medical personnel, for example, with a visualization have been developed in recent years. With conventional methods known from medical practice, markers that are visible or imageable, for example, by a relevant imaging modality being used, may be attached to predefined anatomical features. Such markers may then enable a registration of image data with other data records, just as with a tracking of a movement. However, this is associated with a corresponding effort for the placement and later removal of the markers and cannot provide a precise result in all situations. For example, in the case of a resection, a marker is arranged on a remaining anatomical part and thus may not provide satisfactory results in the region of the resection in the event of a deformation of the respective anatomical part.

SUMMARY AND DESCRIPTION

It is an object of the present disclosure to enable an improved support to medical personnel. The scope of the present disclosure is defined solely by the appended claims and is not affected to any degree by the statements within this summary. The present embodiments may obviate one or more of the drawbacks or limitations in the related art.

A medical imaging device has a data acquisition facility, a detection facility, and a data processing facility. Some or all of these facilities may be integrated or combined, for example, they may be or represent parts or functions of a common device or unit, for example, a circuitry unit or data processing unit. The data acquisition facility serves, that is, it is designed and configured to receive a three-dimensional (3D) data record, generated by a first imaging modality, of an examination object and to receive image data, generated by a second imaging modality, of the examination object. Herein, the first and the second imaging modalities are different from one another. Furthermore, herein, at least one first and second tissue region of the same organ represented both by the 3D data record and also by the image data respectively have different imaging properties under at least the second imaging modality. The two tissue regions may have different imaging properties under the two imaging modalities. It may be provided, in particular, that the two tissue regions are similar, that is, are of the same style or the same type of tissue. Such tissue regions of the same organ cannot be readily distinguished or delineated from one another with conventional methods and may only be insufficiently defined with markers.

An imaging property is therein a property of the respective tissue region which leads to this tissue region being represented or imaged by the respective imaging modality in a particular manner, in particular, delineated against surrounding tissues or tissue regions. The imaging property may be an enhanced contrast as compared with an uninfluenced state, a changed color, a changed reflection, or absorption behavior for a radiation and/or the like used as part of the respective imaging modality. By the different imaging properties, the two tissue regions are thus differentiable from one another, although they are or may be from the same tissue or the same tissue type. These different imaging properties may be generated, for example, by at least one of the tissue regions being marked by a contrast medium or a dye. Similarly, for example, a blood vessel which supplies a tissue region may be clamped or constricted before the recording of the image data and/or, if relevant, of the 3D data record in order to create an ischemia, that is a blood undersupply, in the respective tissue region, which may affect, for example, the color or a spectral reflectance and/or an oxygen content of the tissue region in a detectable manner.

The acquisition of the 3D data record and of the image data may include or mean their actual recording or measurement by the respective imaging modality. The imaging modalities may thus be part of the medical imaging device or connected thereto. If the first imaging modality is, for example, a computed tomography or a computer tomograph or a magnetic resonance system, the medical imaging device may accordingly be designed as a computer tomograph or as a magnetic resonance system or may include one such.

Equally, the acquisition of the 3D data record or of the image data may mean or include their retrieval from a corresponding data store by the data acquisition facility, for example, via a corresponding data interface or data connection. In this case, the medical imaging device may be configured as a computer or a computation facility or as a data processing device.

These possibilities of acquisition may be different or independent from one another for the 3D data record and the image data. For example, the 3D data record may be a CT or magnetic resonance data record already recorded in the past which is retrieved by the medical imaging device from a corresponding data store, whereas the image data may be recorded at a respective current time point, e.g., as live data of the examination object. Equally, the 3D image data record may be or may include a 3D model of the examination object generated from such a 3D CT or 3D magnetic resonance data record. In certain examples, the image data may be or may include one or more camera images or a video or a video stream of the examination object. Accordingly, the second imaging modality may be a camera or a camera-based imaging of the examination object.

The examination object may be a patient, a subregion of the patient, the organ, or a part of the organ. The organ may thus be the examination object or a part of the examination object.

The detection facility of the medical imaging device serves and thus is designed and configured for the automatic detection of at least one tissue boundary in the image data between the first tissue region and the second tissue region on the basis of the different imaging properties. The detection facility may thus be or include an image processing and/or object recognition or feature recognition algorithm or a correspondingly configured electronic data processing unit. The tissue boundary may herein be a line or an area, depending upon the configuration of the image data.

The data processing facility of the medical imaging device serves, and thus is designed and configured for the automatic registration of the image data with the 3D data record by alignment of the at least one detected tissue boundary on a corresponding segment or tissue boundary in a 3D data record. The image data and the 3D data record may thus be virtually overlaid or brought into coincidence, so that spatial points or regions corresponding to one another, in the present case in particular, the tissue boundary, are brought into coincidence with one another or into a spatial positional relationship to one another corresponding to reality or are assigned to one another accordingly. A corresponding assignment may be given by determining a transformation of corresponding coordinate systems of the 3D data record and of the image data into one another, so that by the determined transformation, the image data may be spatially correctly mapped onto the 3D data record or vice versa.

The tissue boundary along which the tissue regions or their different imaging properties meet one another serves here therefore as a reference for the registration. The tissue boundary may herein be an abstract line or area which does not necessarily itself correspond to a concrete anatomical feature. Because the tissue boundary may extend here directly through or along a part of the organ that is, for example, to be resected, without physically hindering or limiting the respective treating surgeon. Equally, as distinct from a marker, the tissue boundary does not have to be manually placed and subsequently removed again. The tissue boundary may thus advantageously also enable an advantageous and reliable marking and visualization in situations in which, for example, a conventional marker is not, or not reliably, usable.

In the 3D data record, the corresponding tissue boundary may be given or marked by a corresponding automatic, semi-automatic or manual segmentation. Equally, the tissue boundary may be estimated in the 3D data record, for instance, by geometrical methods based upon a vascular tree contrasted for the 3D data record or upon a respective spacing of parts or volume elements of the organ from the vascular tree or individual vessels of the vascular tree which supply different tissue regions.

Additionally or alternatively, the data processing facility of the medical imaging device is designed and configured for automatic movement compensation of a movement of the examination object that has taken place or arisen during the generation of the image data, by the at least one tissue boundary. Herein, the tissue boundary may thus serve as a marker or reference feature on the basis of which the movement of the examination object may be detected and tracked. This is also more flexible and reliable, where relevant, and is possible with less physical restrictions or impediments than in the use of conventional physical markers. The movement compensation may be carried out, for example, for an overlaying of the 3D data record and the image data, so that the image data may be overlaid on the 3D data record spatially correctly, that is, according to a respectively current posture of the examination object, so that a reliable and correct overview of the respectively current anatomical situation may be provided to the respective medical personnel.

Equally, the movement compensation may additionally or alternatively be carried out, for example, for the 3D data record and/or virtual data overlaid on the image data, for example, a virtual model of at least part of the examination object, of an instrument, an instrument path, a target region (region of interest, RoI) and/or the like, on the basis of the tissue boundary. For this purpose, the tissue boundary may thus be tracked in the image data or by the image data, in particular optically. The tissue boundary defined by the different imaging properties of the tissue regions meeting one another along the tissue boundary represents thereby a substantially simpler, more reliably and robustly trackable feature than conventionally used surface features.

Overall, the present disclosure offers, by making a tissue, that is, the at least two tissue regions, visible in two different imaging modalities or imaging techniques and through the use of the tissue boundary as a reference feature, improved capabilities as compared with conventional methods for supporting the medical personnel, for example, by an improved visualization and/or an improved guidance or navigation.

In an advantageous embodiment, the medical imaging device, (e.g., the detection facility of the medical imaging device), is configured to carry out an automatic segmentation of the 3D data record and/or the image data on the basis of the different imaging properties. In other words, the medical imaging device is configured to process the 3D data record and/or the image data, for example, by an image processing algorithm, and to recognize or treat a jump in the imaging properties, that is, for example a contrast jump or a color jump, as the boundary between the tissue regions. If the organ is, for example, a liver, then different segments, lobes or vascular supply regions of the liver may be the different tissue regions.

In conventional methods, this may be performed manually in that different branches of a vascular tree which supply different tissue regions or segments are marked and then the tissue regions or segments are defined based upon geometric methods, for example, by assignment of individual parenchyma-volume elements to a branch of the vascular tree on the basis of a respective least spacing between the respective volume element and a vessel.

With the present disclosure, this conventionally manual process that may be imprecise due to model assumptions may be replaced by an automated process, whereby the segmentation may be carried out or achieved more rapidly and, where relevant, more reliably or more accurately.

If the imaging properties of the different tissue regions are changed, for example, by introducing a contrast medium or a dye and/or by constricting or clamping a branch of the vascular tree, then—by corresponding physiological processes—exactly one respective vascular supply region, that is, a respective segment, is accordingly marked or emphasized, whereby the contrast medium or the dye or the blood undersupply spreads out through even the smallest vessel branches, which with conventional methods would possibly not be visible or may be taken into account manually only with a substantial degree of effort.

In a further advantageous embodiment, the medical imaging device, (e.g., the data processing facility of the medical imaging device), is configured to determine and specify automatically a spacing from the tissue boundary to a pre-defined target tissue. The pre-defined target tissue may be a tumor or a tissue change. By determining and specifying the spacing between this target tissue and the tissue boundary, it may advantageously be specified or identified how much safety margin still exists, for example, on a resection of the target tissue before a danger of damage to a vessel from the vessel region or supply area exists on the other side of the tissue boundary. Equally, on the basis of the spacing, for example, it may be estimated whether the target tissue may extend, if relevant, through the tissue boundary into deeper regions of the organ. The determined and specified spacing thus offers valuable data to medical personnel, which may facilitate a planning and successful execution of an intervention. The spacing may be specified, for example, as a numerical value, a matrix, or a grid of numerical values, color-coded, as a virtual scale in an overlay image, for example, as a virtual element of a representation of the augmented reality and/or in a similar manner.

In a further advantageous embodiment, the data processing facility is configured to determine automatically a difference of shapes, arrangements, or courses of the at least one detected tissue boundary in the image data and of the corresponding tissue boundary in the 3D data record and to distort the 3D data record or a 3D model generated therefrom according to the difference determined. In other words, the shape or the course of the tissue boundary detected in the image data is transferred to the 3D data record or the 3D model generated therefrom. For example, the registration between the 3D data record and the image data may be carried out deformably or elastically. For this purpose, on the basis of the image data or by a comparison of the image data with the 3D data record, a movement field for the examination object or the organ may be determined.

The movement field is a data record, for example, a value matrix or a mathematical function by which a movement or position change of individual volume or surface elements of the tissue regions or of the organ or of the examination object may be defined. This may be related to a non-deformed position or shape which may be provided by the preoperative or pre-interventional 3D data record.

The movement field determined or an inverted movement field determined therefrom may be applied to the 3D data record or the 3D model generated therefrom in order to reproduce the corresponding deformation, e.g., to effect or generate it also in the 3D data record or the 3D model generated therefrom. Because a displacement or a distortion of the examination object and thus also of the tissue boundary may occur during the intervention, caused, for example, by a physical contact between an instrument or tool and the organ, in this way an updated 3D model or an updated 3D data record may advantageously be obtained. Thus, herein a deformed and registered updated 3D data record or a deformed and registered updated 3D model is generated or obtained which defines or represents a real posture and geometry of the tissue regions or the organ at the respective time point of acquiring or generating the image data. This may advantageously give support to the respective medical personnel by a situation-adapted and realistic visualization or representation of a respective anatomical situation The image data may be, (e.g., stereoscopic), camera images as much as, for example, an intra-interventionally or intraoperatively recorded CT or magnetic resonance or ultrasonic data record.

In a further advantageous embodiment, the medical imaging device is configured to generate and output an augmented image by overlaying the image data with an overlay image which represents a three-dimensional continuation of the at least one detected tissue boundary through a volume of the organ. The tissue boundary or its continuation may then therefore be a volume boundary between the two then three-dimensional tissue regions, that is, may be or define a boundary area between these tissue regions. This boundary surface, that is, the tissue boundary or the continuation thereof may be a virtual object or model which may be inserted into the augmented image. Because the image data represents or images the real examination object, there is therefore a representation of the augmented or mixed reality, so that the augmented image may also be designated an Augmented Reality (AR) image. The continuation of the tissue boundary or the AR image may advantageously impart to the relevant medical personnel a spatial impression of an anatomical situation which is not visible, for example, by observing the tissue regions or the organ from outside, for example, on the basis of conventional camera images that, for instance, a laparoscope used in the respective intervention may supply.

In this way, the medical personnel may advantageously be assisted during a resection, because, for example, an incision angle may be oriented to the three-dimensional course of the tissue boundary in order to avoid a penetration of the tissue boundary and thereby an injury to the respective adjoining tissue region. This is particularly advantageous because, in particular, vessel injuries and corresponding bleeding represent a significant challenge, for example, during liver resections. Equally, a course of vessels below the visible tissue surface that are not visible in a 2D image recorded, for example, by a laparoscope may be inserted in order to prevent an unintentional injury to these vessels.

The continuation of the tissue boundary may be estimated or may have been estimated, for example, by a biomechanical model of the organ on the basis of the, in particular, pre-interventional or preoperative 3D data record and, where relevant, the deformation of the 3D data record or a 3D model generated therefrom according to the biomechanical model and the course of the, for example, two-dimensional tissue boundary detected in the, in particular, intra-interventional image data. Equally, the continuation of the tissue boundary may be determined, for example, on the basis of an intra-interventional further or second 3D data record, for example, a 3D CT or 3D magnetic resonance data record. In each case, an impression of the respective anatomical situation beneath a visible surface of the tissue regions or of the organ, that is, the respective anatomical situation in the volume of the organ may be offered for support to the medical personnel by the augmented image. For this purpose, the augmented image may be output by a stereoscopic or 3D display device, for example, by a stereoscopic or 3D screen or an AR headset or a head-mounted display (HMD).

In a further advantageous embodiment, it is provided that in the 3D data record, the at least one corresponding tissue boundary is marked or will be marked three-dimensionally or, for example, by the medical imaging device. This may be realized, for example, by a corresponding automatic, semi-automatic, or manual segmentation. Furthermore, it is then provided that the image data includes at least one stereoscopic camera image of the organ following a resection of the organ. The image data may include stereoscopic camera images which are or have been generated or recorded before and after and/or continuously during the resection of the organ. The data processing facility is then configured to reconstruct automatically a 3D surface of at least one remaining subregion of the organ and to carry out and/or to update the registration of the image data with the 3D data record taking account of the reconstructed 3D surface. For example, on the basis of the reconstructed 3D surface, if relevant, by comparison with a stereoscopic camera image recorded before the resection and/or with the pre-interventional 3D data record, an extent of the resection, that is, a removed volume or a size of a removed tissue region of the organ, may be estimated or modeled.

The reconstruction of the 3D surface may be carried out, just like the registration or its updating, continuously or regularly, in particular automatically, for example, as soon as a change in the 3D surface is detected and/or if new surfaces or regions of the organ are exposed. Because the different imaging properties of the tissue regions may relate to their respective exposed surface or their respective overall volume, by the present disclosure, with the registration method based ultimately upon the different imaging properties, the registration may advantageously also still be reliably carried out or maintained in the case of a resection, that is, a physical shape and volume change of the tissue regions or of the organ, despite the deviation from the pre-interventional 3D data record which then arises.

The registration thus advantageously also still functions in the present case if an incision has already been made into the depth or the volume of the organ, because the different imaging properties, that is, the multispectral tissue boundary between the tissue regions may advantageously exist in the entire volume of the organ.

Since by the resection and a thereby possibly simultaneously occurring displacement or deformation of the organ or the tissue regions, a substantial calculation effort may arise for the registration, pre-defined boundary conditions may advantageously be considered in order to limit the calculation effort. For example, a shape change with maximum stiffness, also designated in the technical language as as-rigid-as-possible shape manipulation, may be assumed, that is, a corresponding assumption of stiffness may be made for the organ. In the present case, on the basis of the stereoscopic camera image, it may thus be estimated how far a currently exposed surface of the tissue region or of the organ below an original surface of the tissue regions or of the organ according to the pre-interventional 3D data record. By this, the registration between the image data and the 3D data record is also possible if the shape and position of the organ surface in the 3D data record differs from the shape and position of the respectively exposed surface of the organ imaged by the intra-interventional image data.

In a further advantageous embodiment, the different imaging properties include a fluorescence of one of the tissue regions in a spectral region lying outside the visible spectrum. This tissue region may thus fluoresce in the infrared region, which is not detectable within the human visual capability or in conventional camera images. The medical imaging device includes, in order to generate the image data, a multispectral camera which is configured to generate as part of the image data both a fluorescence image in the spectral region of the fluorescence and also, in particular, simultaneously therewith, an optical image in the visible spectrum or spectral region. The multispectral camera may be integrated into a laparoscope which is connected via a data connection to the data acquisition facility. The second imaging modality is thus provided by the multispectral camera, wherein the tissue regions or their imaging properties differ in that only one of the tissue regions fluoresces in the spectral region lying outside the visible spectrum. For this purpose, the corresponding tissue regions may be marked with a fluorescing dye, for example indocyanine green (ICG). The multispectral camera may include a plurality of lenses, filters, beam splitters, and/or image sensors or the like in order to record the fluorescence image as well as the optical image. For example, by overlaying the fluorescence image and the optical image, the tissue region may then be or have been made recognizable to the relevant medical personnel, in particular without physical hindrance, such as, for example, a corresponding marker could represent. At the same time, an undisplaced and uninfluenced view of the organ as it actually appears is made possible for the medical personnel by the optical image.

In a further advantageous embodiment, the image data includes images created by a camera and the medical imaging device is configured, for the registration and/or the movement compensation, to track a posture of the camera during the generation of the image data. For this purpose, the medical imaging device includes a tracking facility, that is a tracking system, and/or is itself configured for an automatic tracking of the camera based upon the image data. The former is designated outside-in tracking and the latter inside-out tracking. The tracking facility may track the camera, for example, by an electromagnetic tracking and/or image-based, for example, by at least one marker arranged on the camera and/or by object recognition in simultaneously recorded fluoroscopic images in which the camera is visible. By the tracking of the camera, the registration or the movement compensation are advantageously particularly reliably carried out. Because therefore the respective posture of the camera and thus a spatial position of the images generated or recorded by the camera is defined relative to a coordinate system, for example, of the 3D data record, an update of the registration and/or the movement compensation may then be carried out or maintained during a movement of the camera and/or of the examination object particularly easily, that is, with particularly little computation effort.

In a further advantageous embodiment, the 3D data record shows a pre-interventional state of the examination object. The medical imaging device is then configured to receive or acquire a second 3D data record, which like the image data, shows an intra-interventional state of the examination object, and to register this second 3D data record to the pre-interventional 3D data record. In the intra-interventional state, either one of the tissue regions is marked with an X-ray visible contrast medium and with a fluorescence dye and the second 3D data record is a 3D CT data record or one of the tissue regions is marked with an X-ray-visible contrast medium and, on the basis of a blood supply property, is differentiable from the other tissue region and the second 3D data record is, for this purpose, a 3D magnetic resonance data record which is recorded by a sequence which maps the blood supply property. The blood supply property may be a perfusion or a blood oxygen content. The blood oxygen content may be determined or differentiated, for example, by a blood oxygenation level dependent (BOLD) contrast or by a BOLD sequence. In both variants, it is thus provided that the tissue regions are differentiable by the respective imaging modality used for recording the second 3D data record on the basis of their different imaging properties.

Furthermore, the medical imaging device is then configured to track the marked tissue region on the basis of the continuously acquired image data which includes camera images of the tissue regions. The image data may either acquire or image the fluorescence of the marked tissue region or a changed color of the tissue region due to the different blood oxygen content. The medical imaging device is further configured to update the registration automatically on the basis of the image data.

It may thus be provided herein, for example, that a mixture of X-ray visible contrast medium and fluorescence dye is injected directly under a surface of the organ, e.g., at a plurality of locations. Alternatively, the surface may also be coated externally with such a mixture, that is, visibly "painted". For example, with a C-arm CT device, the spatial position of this contrast medium enrichment—and thus the position or posture of the organ or of the organ surface—may be registered to the pre-interventional 3D data record or a 3D model created therefrom. Subsequently, the fluorescing surface regions created by the injection may be tracked optically, (e.g., by the camera or the image data), whereby a movement updating of the registration of the preoperative 3D data record or of the 3D model generated therefrom may be achieved.

Because the image data may be recorded continually, (e.g., as a video stream), the registration may be continuously updated accordingly, (e.g., dynamically maintained), in particular in real time. In particular, the registration may also take place elastically, as described.

The embodiment or method described here is advantageously suitable, in particular, for short-notice or short-term applications and for application cases in which the blood flow of the organ, at least to the correspondingly marked tissue region, is interrupted, also for organs with a relatively low diffusion speed along the surface. In these cases, the registration or its updating may be carried out with relatively little effort, but still reliably, before the fluorescence dye may diffuse along the surface of the organ and thus before the marking or the detectability of the tissue boundary between the tissue regions may become blurred. It is particularly advantageous here as compared with conventional methods that no fluorescing markers (e.g., fiducials) are necessary, which may save costs and development effort.

In the second variant, that is, the intra-interventional or intraoperative recording of a magnetic resonance data record, (e.g., with a BOLD sequence or another sequence which makes the blood supply property within the organ visible), the second 3D data record may be used for a 3D-3D registration to the pre-interventional 3D image data record or the 3D model resulting therefrom. Here also, the multi-spectral tissue boundary on the surface of the organ may subsequently be optically tracked by the camera or the image data, in order to obtain a movement update of the registration.

In an advantageous embodiment, the medical imaging device is configured to receive or acquire a second 3D data record, which, like the image data, shows an intra-interventional state of the examination object. In particular, this may be the aforementioned second 3D data record. The medical imaging device is further configured, on the basis of a segmentation of the second 3D data record, (e.g., a segmentation of a boundary between the different imaging properties, a segmentation of the surface of the organ, and/or a segmentation of a vascular tree of the organ contrasted only in one of the tissue regions), to determine the corresponding tissue boundary between the tissue regions. The medical imaging device is further configured to use the thus determined tissue boundary as the corresponding tissue boundary in the 3D data record or a 3D model generated therefrom.

It may thus be provided that in the 3D data record, e.g., the tissue boundary, at least one boundary of the tissue regions or segments of the organ is estimated and this estimated tissue boundary is then discarded after the tissue boundary determined on the basis of the intra-interventionally recorded second 3D data record is available. It may thereby be provided that an elastic or deformable registration is carried out between the second 3D data record and the image data before the tissue boundary determined on the basis of the second 3D data record is transferred to the pre-interventional 3D data record or the 3D model generated therefrom. Equally, the corresponding distortion or elastic registration or registration updating may be carried out after the transfer between the image data and the correspondingly updated pre-interventional 3D data record.

Optionally, a segmentation and/or another visualization from the second 3D data record and/or the image data may be used in order to generate superpositions or a virtual model for an augmented image, that is, an AR representation.

The embodiment proposed here advantageously enables an extensive planning of the respective intervention on the basis of the preoperative or pre-interventional 3D data record without the respective patient having to wait during it, for example, prepared ready for the operation. At the same time, by the updating of the pre-interventional 3D data record which may be designated the first 3D data record, on the basis of the intra-interventionally recorded second 3D data record, in particular automatically, a particularly reliable three-dimensional visualization of the respective anatomical situation in the respective current position of the patient or the examination object may be offered to the relevant medical personnel. By this support, the respective intervention may then be carried out particularly safely and with a particularly high likelihood of success.

The three-dimensional anatomical situation may be particularly reliably reflected through the use of the second 3D data record for updating the pre-interventional first 3D data record or the 3D model generated therefrom if the image data includes only two-dimensional images, (e.g., camera images), which cannot represent a non-transparent internal volume of the organ.

In a further advantageous embodiment, the medical imaging device includes a display device. This display device may be a screen or an HMD, (e.g., an AR headset or the like). The medical imaging device is configured to generate automatically, from the 3D data record, the image data and/or the detected tissue boundary, an overlay image, (e.g., an image of the augmented reality (AR) or mixed reality (MR) in which the two tissue regions are differently displayed). Furthermore, the medical imaging device is configured to output this overlay image by the display device. In the overlay image, therefore, for example, the 3D data record or a 3D model generated therefrom and the image data may be overlaid. The image data may be or include images from or with different spectral regions.

Equally, the tissue boundary or the tissue region delimited by the tissue boundary may be gathered from the image data, for example, by a corresponding, in particular automatic, segmentation and overlaid on the 3D data record. Equally, the overlay image may be an overlaying of the different individual images of the image data so that, for example, a fluorescence image which images or represents a fluorescence of one of the tissue regions in a non-visible spectral region and an optical image which represents or images the tissue regions in the optical spectral region are overlaid on one another to generate the overlay image. Therein optionally, additional virtual models or elements, for example, the 3D model generated from the 3D data record, may be inserted or overlaid. The overlay image may thus be, in particular, a mixture or a combination of three-dimensional and two-dimensional images or image contents. An overlay image of this type may advantageously offer a particularly comprehensive and content-rich support to the medical personnel.

A further aspect of the present disclosure is a method for supporting medical personnel. A method act of this method is an acquisition of a 3D image data record of an examination object generated by a first imaging modality. A further method act of the method is an acquisition of image data of the examination object generated by a second imaging modality different from the first imaging modality, wherein in the 3D data record and in the image data, at least one first tissue region of an organ and at least one second tissue region of the same organ are represented and the tissue regions have different imaging properties at least under the second imaging modality. A further act of the method is a detection of at least one tissue boundary between the first tissue region and the second tissue region in the image data on the basis of the different imaging properties. A further act of the method is a registration of the image data to the 3D image data record by alignment of the at least one detected tissue boundary to a corresponding tissue boundary of the 3D image data record and/or a performance of a movement compensation of a movement of the examination object occurring during the generation of the image data, on the basis of the at least one tissue boundary.

In other words, the method thus includes the measures, procedures, or sequences described in relation to the medical imaging device. Further procedures, measures or sequences cited in this regard may be regarded as, possibly optional, further method acts of the method.

A further aspect of the present disclosure is a computer program product, e.g., a program code, which includes commands or control instructions which on execution of the computer program product or program code by a computer, in particular, by the medical imaging device or its data processing facility, cause this computer to carry out at least one variant or embodiment of the method, in particular automatically or semi-automatically.

A further aspect of the present disclosure is a computer-readable storage medium on which at least one embodiment of the computer program product is stored.

In particular, it may be provided that the medical imaging device includes a computer-readable storage medium. The medical imaging device may thus be designed and configured in particular for, (e.g., automatic or semi-automatic), performance of at least one variant of the method. For this purpose, the medical imaging device may include a processor device, for example, a microprocessor, a microchip or a microcontroller, which is connected to the computer-readable storage medium and is configured to carry out the computer program product or program code stored thereon.

It should be noted at this point that any surgical acts or measures mentioned or indicated for illustration of the present disclosure are not part of the method. The present disclosure, in particular the method, is thus only claimed insofar as the disclosure or the method does not include any surgical act. This does not, however, hinder an executability or usability of the present disclosure, because the medical imaging device and the method may be used, just like the method, in parallel with an intervention or a surgical procedure, but may serve only for the, in particular automatic, support of the respective medical personnel and equally may be used, operated or carried out independently of the actually performed surgical acts on the basis of correspondingly provided data. Even if the method may advantageously be at least partially carried out during the aforementioned interventional procedure, it relates ultimately only to a corresponding control or a corresponding operation of the medical imaging device or of a corresponding data processing facility and not to the surgical acts possibly performed during the procedure or intervention.

The properties and developments stated above and in the following of the method, the medical imaging device, the method, the computer program product and the computer-readable storage medium, as well as the corresponding advantages are each analogously and reciprocally transferable between these aspects of the disclosure. Such developments of the imaging device, the method, the computer program and the computer-readable storage medium which have embodiments which, for the avoidance of unnecessary redundancy, are not explicitly described here in the respective combination or are not separately described for each of these aspects of the present disclosure, thus also belong to the disclosure.

BRIEF DESCRIPTION OF THE DRAWINGS

Further features, details, and advantages of the present disclosure are provided in the following description of exemplary embodiments and are illustrated in the drawings, in which.

DETAILED DESCRIPTION

The components of the embodiments as described in the exemplary embodiments each represent individual features of the disclosure that are to be regarded as independent of one another and each also further develop the disclosure independently of one another and are thus also to be considered individually, or in a different combination from that shown, as a constituent part of the disclosure. Furthermore, the embodiments described are also enhanceable through others of the previously described features of the disclosure.

In the figures, elements which are identical, have the same function or correspond to one another are each provided with the same reference signs for the sake of clarity, even though they may represent different instances or examples of the corresponding elements.

In the field of medical imaging technology, an image-based guidance and navigation is desirable for many applications, for example, for a liver resection, in particular if individual segments or blood supply regions are to be resected—in contrast to a large-scale anatomical resection in which, for example, an entire organ half is to be removed. In a resection, all the parenchyma of a segment or blood supply region may be to be removed with the aim of leaving no ischemic tissue or parenchyma behind. Such segment-selective resections, in particular, liver resections, are currently a much investigated topic because they represent an advantageous alternative approach to conventional resections in which, for example, a safety region of approximately 1 cm width is resected round an identified tumor tissue—regardless of an anatomical or geometrical structure or segment boundaries or the boundaries of blood supply regions.

Even if, in an individual case, it is not desired to follow the limits of the segments or blood supply regions exactly, knowledge of a position or a course of these limits would be valuable. In particular, a knowledge of the actual intra-interventional course of the segment boundaries is particularly valuable in contrast to the theoretically calculated segment boundaries or volumes calculated, for example, by an algorithm based upon a preoperative segmentation.

Known approaches use markers attached to the liver surface and/or attempt an optical feature tracking. It is disadvantageous thereby that additional effort and a limited accuracy and potential hindering of respective medical personnel is associated with the markers and that the existing anatomical features may not be very robustly or reliably detectable and trackable and that the optical feature tracking may only function relative to an initialization, wherein an error in the tracking may grow over time.

A segment-selective contrast doping may be achieved by introducing a dye, (e.g., indocyanine green (ICG)), into a supply route, for example, a vascular tree branch for a particular segment and/or by an interruption of a supply to, for example, adjacent segments. Equally, the supply to a particular segment may conversely be interrupted and then the dye may be introduced into a common supply route so that the dye spreads out only into the other segments and does not reach the segment supplied by the separated supply route. This leads to a marking or identification of the segment boundaries along which a surface incision may then be made. However, it may be difficult to keep a treatment or sectional plane oriented along the segment boundary when cutting deeper into the tissue. If, therein, the segment boundary is damaged, then the dye may flow through this damage into adjoining segments and thus blur the segment boundary. A further difficulty is that, by the dye, it may not be made known which vessels extend along an incision path during the resection. In particular, in many patients, anatomical variations of a vessel route, for example of liver arteries or gall ducts across segment boundaries, for example from supply regions defined by portal veins may arise.

Figure 1:
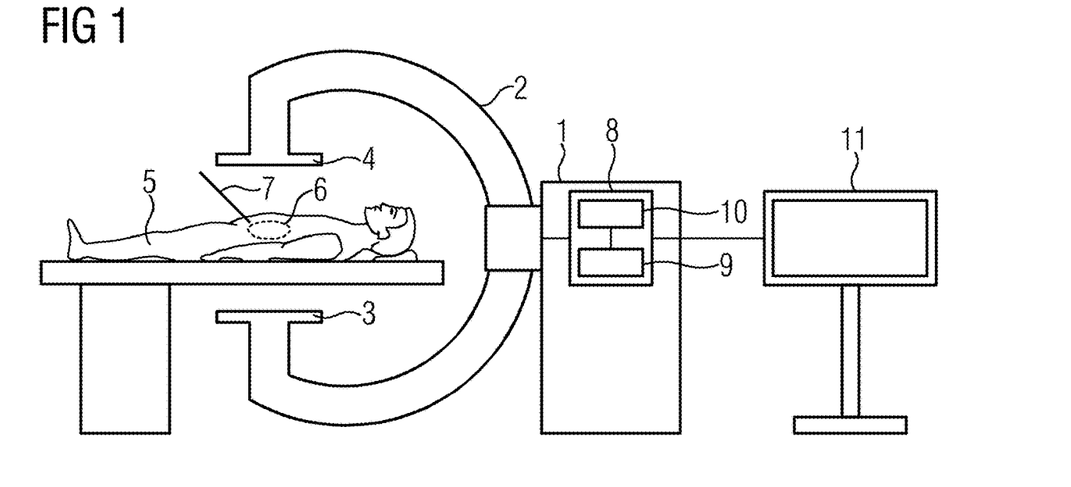
FIG. 1 depicts an example of a schematic view of a medical imaging device.

Against this background, in order to offer technical support to medical personnel, herein a correspondingly configured medical imaging device 1 schematically represented in FIG. 1 and a corresponding method are provided. Herein, the medical imaging device 1 has a C-arm 2 on which, as a first imaging modality, a radiation source 3 and a detector 4 arranged opposite thereto are mounted. The medical imaging device 1 herein includes, by way of example, a CT device although the first imaging modality may equally be configured otherwise, for example, in the form of a magnetic resonance system or a data interface for acquiring corresponding data records.

Arranged between the radiation source 3 and the detector 4 herein is a patient 5 who or whose liver 6 serves herein as the examination object. Hereby, a situation is represented in which a laparoscope 7 equipped with a multispectral camera is arranged in the region of the liver 6. The laparoscope 7 may herein record both optical images in a visible spectral region as well as fluorescence images in a spectral region lying outside the visible spectrum. The laparoscope 7 or its multispectral camera thus herein form a second imaging modality which is different from the first imaging modality and is based, in particular, on another imaging principle.

The medical imaging device 1 further includes a data processing unit 8 for receiving or acquiring and processing 3D data records generated by the radiation source 3 and the detector 4 as well as image data supplied by the laparoscope 7. For this purpose, the data processing unit 8 herein includes a computer-readable storage medium 9 and a processor device 10 connected thereto for carrying out a program code or a computer program stored on the storage device 9. The data processing unit 8 may generate images on the basis of the 3D data records and/or the image data and/or by generating virtual models or objects, which images may then be output by a display device 11 also shown schematically here. The display device 11 may be part of the medical imaging device 1 or connected thereto. The representation of the display device 11 should be understood herein as purely schematic, so that the display device 11 may also be, for example, an AR headset or the like.

Figure 2:
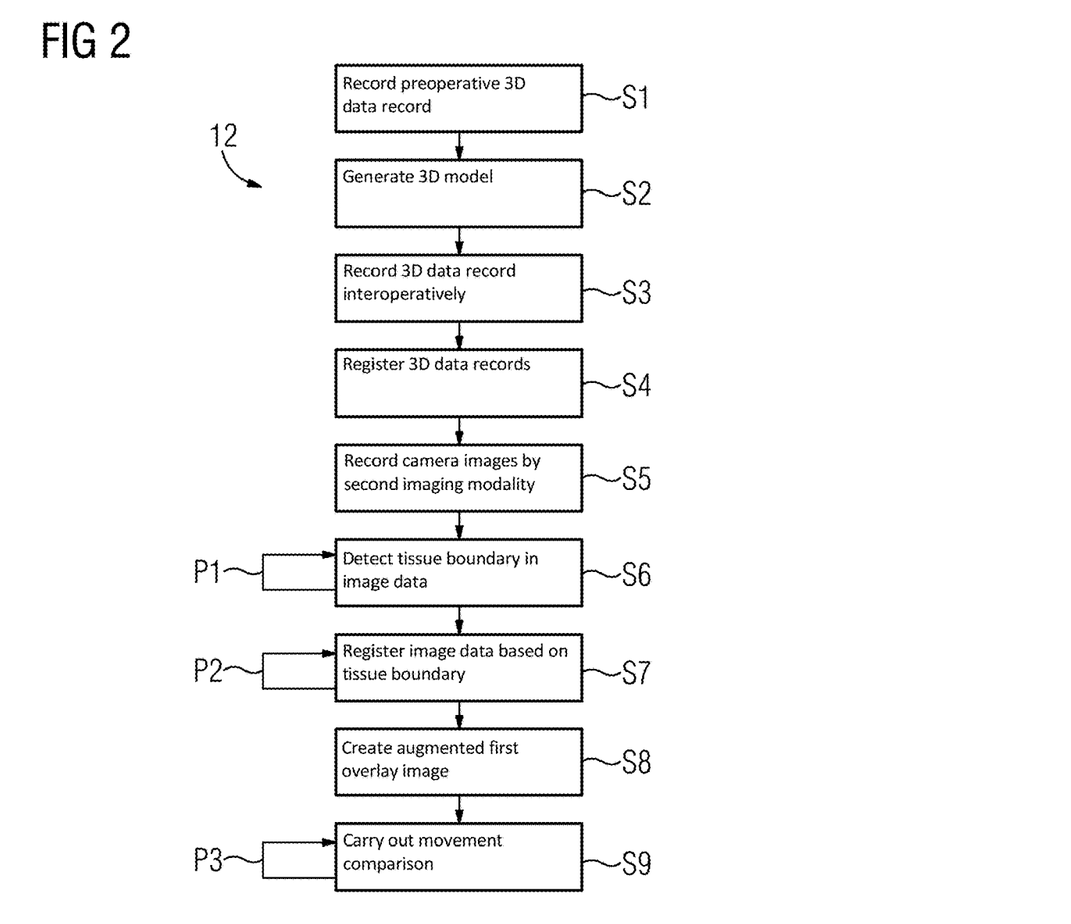
FIG. 2 depicts an exemplary schematic sequence plan of a method for supporting medical personnel.

FIG. 2 shows an exemplary schematic flow plan 12 for the method for supporting the medical personnel, in particular by the medical imaging device 1. This method may be encoded or represented by the computer program stored on the storage device 9. Acts or sequences of the method may thus represent individual program modules, function blocks or functions of the computer program or program code.

In a method act S1, a preoperative or pre-interventional 3D data record 23 (see FIG. 5) of the patient 5 is recorded. The 3D data record 23 may be recorded, that is, generated, for example, by the first imaging modality of the medical imaging device 1 or by another imaging device. The 3D data record 23 may be a 3D CT data record or a 3D magnetic resonance data record.

Figure 3:
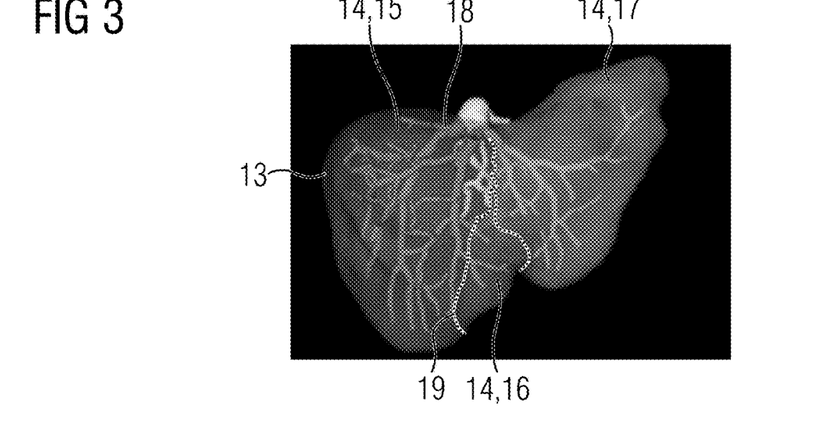
FIG. 3 depicts an example of a schematic 3D model of an organ with a plurality of segments.

From the 3D data record 23, in a method act S2, a 3D model 13 as shown schematically in FIG. 3, is generated, for example, in the present case, of the liver 6. In order to generate the 3D model, the 3D data record 23 may be segmented, for example, automatically, semi-automatically or manually. For this purpose, the 3D data record 23 may have been recorded, for example, with a plurality of contrast phases. Then, for example firstly, contrasted vessels imaged in the 3D data record may be segmented and then vessel portions or vessel branches belonging to different liver segments may be marked. Subsequently, by geometric methods such as, for example, by determining a respective smallest spacing, the imaged organ tissue may be allocated to different supply areas. In other words, anatomical segments of the liver 6 may thus be estimated, based on a structure and arrangement of respective supply vessels.

In FIG. 3, a plurality of tissue regions 14 in the 3D model 13, (e.g., a first tissue region 15, a second tissue region 16, and a third tissue region 17), are delimited from one another, for example, by different colorations. A segment boundary 19 is indicated here schematically between the tissue regions 14. The tissue regions 14 may correspond to the aforementioned segments or liver lobes or to blood supply regions. Furthermore, a vascular tree 18 of the liver 6 is illustrated, wherein the tissue regions 14 are supplied by different vessel branches of the vascular tree 18.

Once, for example, on the basis of the 3D data record 23 and the 3D model 13, an intervention has been planned, for the intervention or during the intervention, imaging properties of the tissue regions 14 may be changed so that they may be differentiated from one another. For this purpose, a respective supply route, for example, a blood vessel branching off a portal vein (Vena portae) may be clamped and/or a contrast medium and a fluorescence dye may be introduced into a supply branch of the vascular tree 18.

Then, in a method act S3, by the medical imaging device 1, a second 3D data record is recorded intraoperatively. Therein, the actual boundaries between the anatomical tissue regions 14 of the liver 6 are recognizable by the segment-wise contrasting or marking by the previously introduced contrast medium. Alternatively, the second 3D data record may herein be recorded intraoperatively, for example, with a magnetic resonance system, making use of a sequence which makes the actual boundaries between the tissue regions 14 or the individual tissue regions 14 recognizable. The intraoperatively defined current posture of the segment boundaries 19 or of the individual tissue regions 14 from the second 3D data record is then registered in a method act S4 to the first preoperative 3D data record 23 or to the 3D model 13 generated therefrom. At this time point, the liver 6 may still correspond with regard to its shape and its volume to a state that it had during recording of the preoperative 3D data record 23, so that the registration is possible in a particularly easy manner. Herein, the segment boundary 19 previously merely estimated for the preoperative 3D data record 23 may be discarded and replaced with the actual segment boundaries 19 determined by using the second 3D data record.

Figure 4:
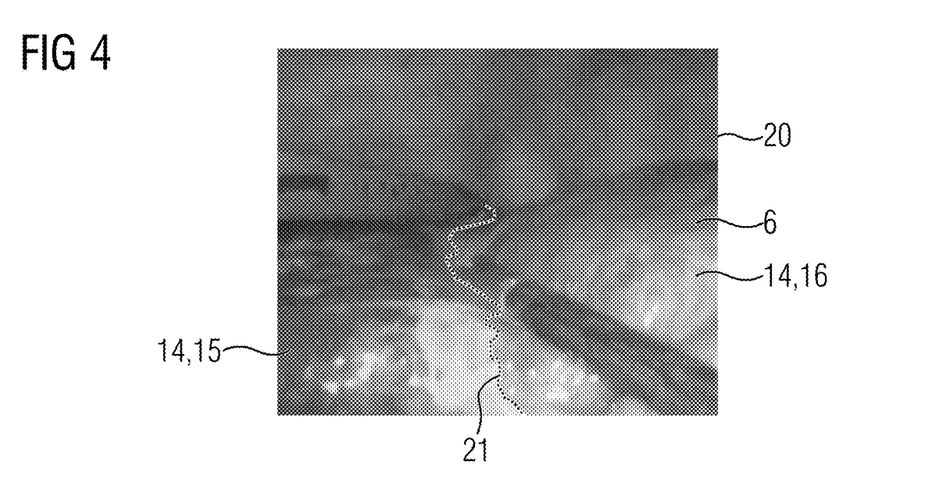
FIG. 4 depicts an example of a portion of a 2D image of the organ.

Then, in a method act S5, image data, in this case therefore camera images of the liver 6 are recorded intraoperatively by the second imaging modality, in this case therefore, by the laparoscope 7. In the present case, as part of the image data, both an optical image is recorded in a visible spectral region as well as a fluorescence image in a non-visible spectral region in which the previously introduced fluorescence dye fluoresces. From this, by overlaying, a 2D image 20 shown schematically in FIG. 4 is generated. In this 2D image 20, for example, the first tissue region 15 and the second tissue region 16 are separated from one another by a tissue boundary 21. In the present case, for example, the first tissue region 15 is flooded with the fluorescence dye, so that it becomes clearly differentiated in the 2D image 20 from the second tissue region 16 which is recognizable only in the visible spectral region and is correspondingly represented. In practice, this is more clearly recognizable with a color image reproduction than in the drawings available here.

In a method act S6, the tissue boundary 21 is detected in the image data, in particular, automatically and on the basis thereof, in particular, an automatic segmentation of the image data is carried out in order to define the tissue regions 14. This automatic segmentation on the basis of the different imaging properties of the tissue regions 14 may be based, for example, upon different colors or different contrast properties of the tissue regions 14. In the present case, therefore, the tissue regions 14, for example therefore, liver segments and/or blood supply regions assigned to individual vessel branches of the vascular tree 18 are segmented on the basis of the respective spatial signal contrast. This signal contrast occurs specifically along the tissue boundary 21.

If the laparoscope 7 is a stereo laparoscope, from the correspondingly stereoscopic image data, a stereoscopic surface reconstruction of the liver 6 and/or the tissue regions 14 may then be carried out. This may be carried out automatically in particular continuously or regularly during the intervention, which here is indicated with a looped program path P1.

A posture of the laparoscope 7 may therein be tracked by a tracking facility, that is, by a tracking system. For example, such a tracking facility may also be arranged on the C-arm 2 so that a pre-defined, in particular solid, spatial positional relationship between a coordinate system of the tracking facility and a coordinate system of the first imaging modality inherently exists, so that corresponding data items are or may be registered to one another without difficulty.

Then, in a method act S7, a registration of the image data to the 3D data record 23 or the 3D model 13 generated therefrom, is carried out, in particular, automatically on the basis of the tissue boundary 21 detected in the image data. For this purpose, this tissue boundary 21 may be aligned, for example, on the corresponding segment boundary 19 in the 3D data record 23 or in the 3D model 13. Because the 3D model 13 has been generated from the 3D data record 23, for the 3D data record 23 and the 3D model 13, the same coordinate system may be used without difficulty, so that the registration of the image data to the 3D data record 23 also automatically leads to a registration of the image data to the 3D model 13. In the context of this registration, a deformation or distortion of the tissue boundary 21, the tissue regions 14 or the whole liver 6 may be transferred to the 3D data record 23 and/or the 3D model 13. This provides as a result, according to a respective current anatomical situation, a correctly deformed but still registered 3D model 13 and/or a correspondingly deformed and registered 3D data record 23. Herein, the volume change of the liver 6 determined on the basis of the stereoscopic surface reconstruction, for example, in the context of a resection carried out during the intervention may also be considered.

Equally, if the registration method or registration processes described here are combined with other registration methods of the prior art. For example, for a further backup, known markers may additionally be positioned on the liver 6 and tracked, for example, also by the tracking facility. A respective position of these markers may then be considered for the registration, also as a further boundary condition, whereby possibly a further improved accuracy or reliability may be achieved.

In the present case, for the registration of the image data to the 3D data record 23 or to the 3D model 13, a position of blood supply areas or liver segments, therefore herein the tissue regions 14 are adjusted to the position of a multi-spectrally marked surface region, in the present case, the fluorescence surface of the first tissue region 15. Thereby, both these spectrally changed, thus in the present case fluorescing, surface regions or regions of the liver 6, as well as spectrally unchanged, that is, non-fluorescing, surface regions or regions of the liver 6, herein for example a surface of the second tissue regions 16 may be used, in particular however, the tissue boundary 21 extending between these tissue regions 14 which are different in respect of their imaging properties or spectral properties.

In the preoperative 3D data record 23 and/or in the 3D model 13, it may be stated or specified or automatically discerned which of the tissue regions 14 have been changed spectrally during the intervention, that is, with regard to its imaging properties and which tissue regions 14 have remained unchanged spectrally.

As described, additionally or alternatively, a color change and thereby a change in a spectral absorption and/or reflection of the respective tissue surface or tissue regions 14 may be generated by creating an ischemia of one or more of the tissue regions 14, the color change also being detectable by the laparoscope 7 and being usable for the determination or detection of the tissue boundary 21 and for the registration. Equally, additionally or alternatively, a degree of a blood oxygenation close to the respective surface of the tissue region 14, that is a so-called BOLD contrast may be detected and used for the determination and detection of the tissue boundary 21 and for the registration.

The registration and/or the deformation may equally be repeatedly updated according to the, in method act S6, continuously detected or tracked tissue boundary 21, which here is indicated with a looped program path P2.

Figure 5:
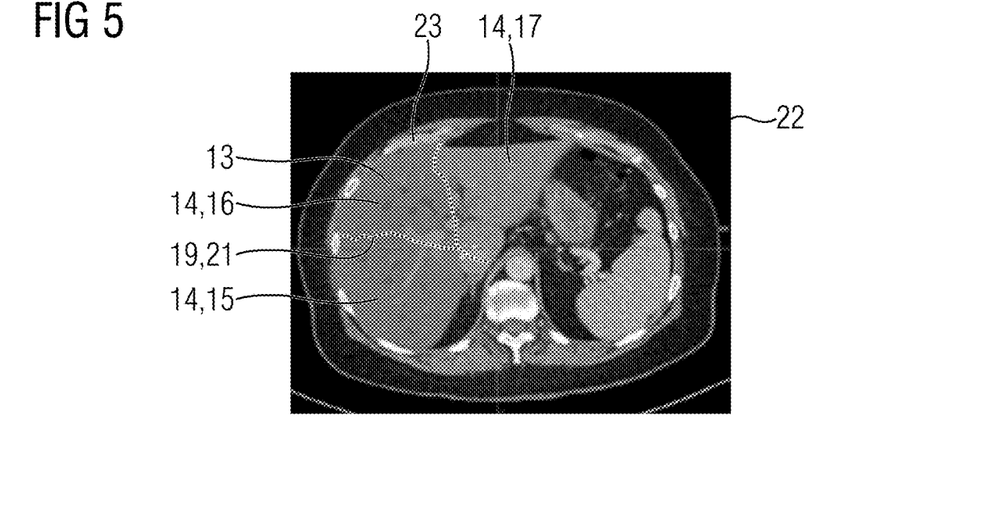
FIG. 5 depicts an example of a schematic first overlay image.

In a method act S8, an augmented first overlay image 22 shown schematically in FIG. 5 based on the 3D data record 23, the 3D model 13 and the image data or the tissue boundary 21 detected therein may be created. The first overlay image 22 may be regarded as the result of the registration. In the first overlay image 22, in the present case, the 3D model 13 adapted according to the image data and adapted in respect of the segment boundaries 19 is inserted as a virtual object, also designated an overlay. The first overlay image 22 may be output as an AR image, that is, as an image of the augmented reality, for example, by the display device 11.

In the first overlay image 22, further details or virtual objects may be inserted or overlaid, for example, a spacing between a pre-defined target tissue and the segment boundary 19 or the tissue boundary 21 and respective positions of vessels leading into the individual tissue regions 14 and out of the individual tissue regions 14, in particular along the segment boundary 19 or the tissue boundary 21. In certain examples, a three-dimensional continuation of the tissue boundary 21 through the volume of the liver 6 or the 3D model 13 is shown, which, for the relevant medical personnel, facilitates an orientation and navigation and an understanding of the respective spatial anatomical situation. The details and virtual objects mentioned here may also be inserted into the 2D image 20.

Figure 6:
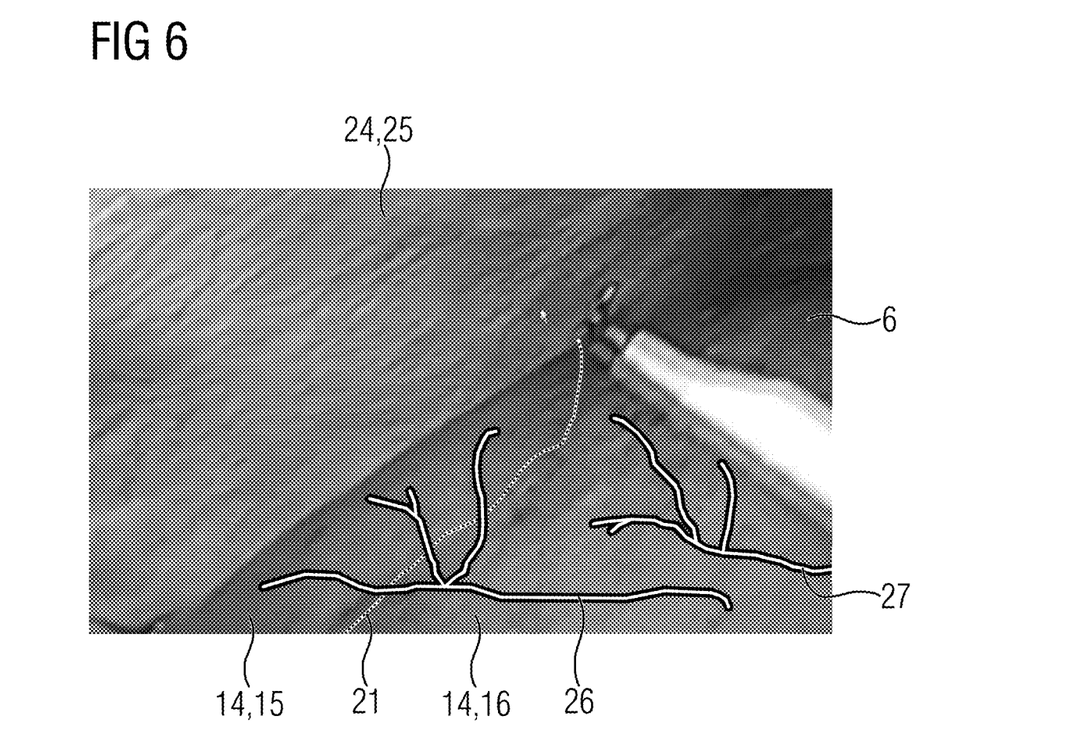
FIG. 6 depicts an example of a schematic second overlay image.

FIG. 6 shows schematically a second overlay image 24 of the liver 6. The second overlay image 24 is based here on a laparoscopy video image 25 recorded by the laparoscope 7 onto which some virtual objects are overlaid. For example, the 2D image 20 may be used here equally as well as the laparoscopy video image 25. In the present case, the virtual objects represent the tissue boundary 21, a first overlaid anatomical structure 26 and a second overlaid anatomical structure 27. For example, the first anatomical structure 26 may represent a first type of vessels, such as gall ducts or the like, which extend beyond the segment boundary or tissue boundary 21. Shown differently or made known for this purpose, the second anatomical structure 27 may represent, for example, a second type of vessels, such as portal veins or the like, which extend within one of the tissue regions 14 and do not penetrate the tissue boundary 21. In the second overlay image 24 also, further details may be inserted or made known, for instance by different coloration of the tissue regions 14.

In a method act S9, the tissue boundary 21 may be optically tracked in the further continuously recorded image data by the laparoscope 7 and/or the data processing unit 8 and accordingly a movement compensation may be carried out for the overlay image 22 and/or inserted virtual elements or virtual objects in the 2D image 20. This movement compensation may be carried out automatically during the whole of the intervention, which here is indicated with a looped program path P3.

The examples given here show how a precise registration and movement compensation for augmented reality overlays in medical imaging, in particular for surgical applications, for example, in the laparoscopic resection of liver tumors may be realized. Thereby, colored or spectral boundaries of blood supply areas resolved, for example, with fluorescence are used in order to carry out both the movement compensation as well as the registration of the preoperative 3D data record 23 or the 3D model 13 derived therefrom. In contrast to conventional methods, hereby, an improved guidance or navigation may be achieved, especially in particularly challenging application cases such as anatomical liver resections which conventionally may only be reliably performed by a few experts. Equally, a more robust optical tracking of organ movements is enabled for surgical augmented reality, in particular without physical markers or marker objects having to be used, that is applied to a respective organ surface. In summary, therefore, described herein are both a registration of intraoperative image data with a preoperative data record on the basis of a segment selective contrasting as well as an AR registration updating based upon multispectral boundaries on an organ surface.

Although the disclosure has been illustrated and described in detail using the exemplary embodiments, the disclosure is not limited by the disclosed examples, and a person skilled in the art may derive other variations therefrom without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A medical imaging device comprising:
   a data acquisition facility configured to receive a three-dimensional (3D) data record of an examination object generated by a first imaging modality and receive image data of the examination object generated by a second imaging modality, wherein the first and the second imaging modalities are different from one another, and wherein a first tissue region and a second tissue region of a same organ respectively imaged both by the 3D data record and also by the image data have different imaging properties under the second imaging modality;
   a detection facility configured to automatically detect at least one tissue boundary between the first tissue region and the second tissue region of the same organ based on the different imaging properties in the image data generated by the second imaging modality; and
   a data processing facility configured to: (1) automatically register the image data with the 3D data record by alignment of the at least one detected tissue boundary on a corresponding tissue boundary in the 3D data record, (2) automatically compensate for a movement of the examination object that has taken place during the generation of the image data and/or temporally between the generation of the 3D data record and the image data, based on the at least one detected tissue boundary, or a combination of (1) and (2).

2. The medical imaging device of claim 1, wherein the data processing facility is configured to automatically determine a difference of shapes of the at least one detected tissue boundary in the image data and the corresponding tissue boundary in the 3D data record, and
   wherein the data processing facility is configured to virtually distort the 3D data record or a 3D model generated therefrom according to the determined difference.

3. The medical imaging device of claim 1, wherein the medical imaging device is configured to generate and output an augmented image by overlaying the image data with an overlay image that represents a three-dimensional continuation of the at least one detected tissue boundary through a volume of the organ.

4. The medical imaging device of claim 1, wherein the corresponding tissue boundary is marked three-dimensionally in the 3D data record, wherein the image data comprises at least one stereoscopic camera image of the organ following a resection of the organ, and wherein the data processing facility is configured to automatically reconstruct, based on the at least one stereoscopic camera image, a 3D surface of at least one remaining subregion of the organ and to carry out and/or to update the registration, taking account of the reconstructed 3D surface.

5. The medical imaging device of claim 1, wherein the image data comprises images generated by a camera, wherein the medical imaging device is configured, for the registration and/or the movement compensation, to track a posture of the camera during the generation of the image data, and wherein the medical imaging device has a tracking facility and/or is configured for an automatic tracking of the camera based on the image data.

6. The medical imaging device of claim 1, wherein the 3D data record is configured to show a pre-interventional state of the examination object, wherein the medical imaging device is configured to receive a second 3D data record that shows an intra-interventional state of the examination object, and to register the second 3D data record to the 3D data record, wherein in the intra-interventional state, either one of the first or second tissue regions is marked with an X-ray visible contrast medium and with a fluorescence dye and the second 3D data record is a 3D CT data record, or one of the first or second tissue regions is differentiable from the other tissue region based on a blood supply property and the second 3D data record is a 3D magnetic resonance data record recorded by a sequence which maps the blood supply property, wherein the medical imaging device is configured to track the marked tissue region based on the image data that comprises camera images of the first and second tissue regions, and wherein the medical imaging device is configured to automatically update the registration based on the image data.

7. The medical imaging device of claim 1, wherein the different imaging properties of the first and second tissue regions of the same organ are configured to be generated by one of the first or second tissue regions being marked by a contrast medium or dye, or wherein the different imaging properties of the first and second tissue regions of the same organ are configured to be generated by a blood vessel supplying blood to one of the first or second tissue regions being clamped or constricted prior to the generating of the image data by the second imaging modality.

8. The medical imaging device of claim 1, wherein the tissue boundary extends directly through the organ or along a part of the organ to be resected.

9. The medical imaging device of claim 1, wherein the medical imaging device is configured to carry out an automatic segmentation of the 3D data record, the image data, or a combination thereof based on the different imaging properties.

10. The medical imaging device of claim 9, wherein the detection facility is configured to carry out the automatic segmentation.

11. The medical imaging device of claim 1, wherein the medical imaging device is configured to determine and automatically specify a spacing from the at least one detected tissue boundary to a pre-defined target tissue.

12. The medical imaging device of claim 11, wherein the data processing facility is configured to determine and automatically specify the spacing.

13. The medical imaging device of claim 1, wherein the different imaging properties comprise a fluorescence of one of the first or second tissue regions in a spectral region lying outside a visible spectrum, and wherein the medical imaging device comprises, in order to generate the image data, a multispectral camera configured to generate as part of the image data both a fluorescence image in the spectral region of the fluorescence and also an optical image in the visible spectrum.

14. The medical imaging device of claim 13, wherein the multispectral camera is configured to simultaneously generate the fluorescence image and the optical image.

15. The medical imaging device of claim 1, wherein the medical imaging device is configured to receive a second 3D data record which, similarly to the image data, shows an intra-interventional state of the examination object, wherein the medical imaging device is configured to determine the corresponding tissue boundary between the first and second tissue regions based on a segmentation of the second 3D data record, and wherein the medical imaging device is configured to use the determined tissue boundary as the corresponding tissue boundary in the 3D data record or in a 3D model generated therefrom.

16. The medical imaging device of claim 15, wherein the segmentation is of a boundary between the different imaging properties, of a surface of the organ, of a vascular tree of the organ contrasted only in one of the first or second tissue regions, or a combination thereof.

17. The medical imaging device of claim 1, further comprising:

a display device, wherein the medical imaging device is configured to automatically generate an overlay image from the 3D data record, from the image data, from the at least one detected tissue boundary, or a combination thereof, and wherein the display device is configured to output the overlay image.

18. The medical imaging device of claim 17, wherein the overlay image is an image of an augmented reality or a mixed reality in which the first tissue region and the second tissue region are made known.

19. A method for supporting medical personnel, the method comprising:

receiving a three-dimensional (3D) data record of an examination object generated by a first imaging modality;

receiving image data of the examination object generated by a second imaging modality different from the first imaging modality, wherein in the 3D data record and in the image data, a first tissue region of an organ and a second tissue region of a same organ are represented and the first and second tissue regions have different imaging properties from each other under the second imaging modality;

detecting at least one tissue boundary between the first tissue region and the second tissue region of the same organ based on the different imaging properties in the image data generated by the second imaging modality; and registering the image data with the 3D data record by alignment of the at least one detected tissue boundary on a corresponding tissue boundary of the 3D data record, and/or carrying out a movement compensation of a movement of the examination object that has taken place during the generation of the image data based on the at least one detected tissue boundary for a registration of the image data and/or for an overlay image generated using the image data.

20. A non-transitory computer-readable storage medium on which a computer program product is stored, wherein the computer program product, when executed by a medical imaging device, causes the medical imaging device to:

receive a three-dimensional (3D) data record of an examination object generated by a first imaging modality;

receive image data of the examination object generated by a second imaging modality different from the first imaging modality, wherein in the 3D data record and in the image data, a first tissue region of an organ and a second tissue region of a same organ are represented and the first and second tissue regions have different imaging properties from each other under the second imaging modality;

detect at least one tissue boundary between the first tissue region and the second tissue region of the same organ based on the different imaging properties in the image data generated by the second imaging modality; and register the image data with the 3D data record by alignment of the at least one detected tissue boundary on a corresponding tissue boundary of the 3D data record, and/or carry out a movement compensation of a movement of the examination object that has taken place during the generation of the image data based on the at least one detected tissue boundary for a registration of the image data and/or for an overlay image generated using the image data.

* * * * *